(12) United States Patent
Kim

(10) Patent No.: US 12,061,294 B2
(45) Date of Patent: Aug. 13, 2024

(54) ERROR CORRECTION METHOD OF SCANNING LiDAR

(71) Applicant: HYUNDAI MOBIS CO., LTD., Seoul (KR)

(72) Inventor: Jung Yong Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 931 days.

(21) Appl. No.: 17/084,273

(22) Filed: Oct. 29, 2020

(65) Prior Publication Data

US 2021/0132200 A1    May 6, 2021

(30) Foreign Application Priority Data

Nov. 4, 2019   (KR) .................. 10-2019-0139786

(51) Int. Cl.
| | | |
|---|---|---|
| *G01S 7/4865* | (2020.01) | |
| *G01S 7/481* | (2006.01) | |
| *G01S 7/497* | (2006.01) | |
| *G01S 17/10* | (2020.01) | |

(52) U.S. Cl.
CPC .......... *G01S 7/4865* (2013.01); *G01S 7/4817* (2013.01); *G01S 7/497* (2013.01); *G01S 17/10* (2013.01)

(58) Field of Classification Search
None
See application file for complete search history.

(56) References Cited

U.S. PATENT DOCUMENTS

| | | | | |
|---|---|---|---|---|
| 2015/0323354 A1* | 11/2015 | Kramer | ................... | G01S 7/497 |
| | | | | 250/231.14 |
| 2022/0187429 A1* | 6/2022 | Ueno | ...................... | G01S 7/497 |
| 2022/0268896 A1* | 8/2022 | Ueno | ...................... | G01S 7/497 |

FOREIGN PATENT DOCUMENTS

| | | |
|---|---|---|
| CN | 103064076 A | 4/2013 |
| CN | 103941262 A | 7/2014 |
| CN | 106463565 A | 2/2017 |
| CN | 107884779 A | 4/2018 |
| CN | 110018495 A | 7/2019 |

(Continued)

OTHER PUBLICATIONS

Office Action issued Jun. 30, 2023 for corresponding Chinese Patent Application No. 202011197599.4 (See English Translation).

(Continued)

*Primary Examiner* — Eric L Bolda
(74) *Attorney, Agent, or Firm* — MORGAN, LEWIS & BOCKIUS LLP

(57) ABSTRACT

A method of correcting an error of a scanning LiDAR, may include: an initial value setting operation of designating an initial emission time point among a plurality of laser light emission time points of the scanning LiDAR; a designated value increasing operation of designating a laser light emission time point after the initial emission time point among the plurality of laser light emission time points; an error determining operation of determining whether an error is generated in the measurement time interval by applying the designated laser light emission time point to a pre-prepared error algorithm; and an error correcting operation of correcting the error of the measurement time interval by use of a pre-prepared correcting algorithm when it is determined that the error is generated in the measurement time interval.

17 Claims, 4 Drawing Sheets

(56) References Cited

FOREIGN PATENT DOCUMENTS

| | | |
|---|---|---|
| DE | 102007030978 A1 | 1/2008 |
| JP | H08-248131 A | 9/1996 |
| JP | H11-84006 A | 3/1999 |
| JP | 2003-149331 A | 5/2003 |
| JP | 2019-191037 A | 10/2019 |
| KR | 10-1403945 B1 | 7/2014 |
| KR | 10-1962398 B1 | 3/2019 |

OTHER PUBLICATIONS

Notice of Allowance issued in corresponding Chinese Patent Application No. 202011197599.4 on Apr. 1, 2024, with English translation.

* cited by examiner

ERROR CORRECTION METHOD OF SCANNING LiDAR

CROSS-REFERENCE TO RELATED APPLICATIONS

The present application claims priority to Korean Patent Application No. 10-2019-0139786 filed on Nov. 4, 2019, the entire contents of which is incorporated herein for all purposes by this reference.

BACKGROUND OF THE INVENTION

Field of the Invention

The present invention relates to a Light Detection and Ranging (LiDAR) system, and for example, to a method of correcting an error of a scanning LiDAR.

Description of Related art

A scanning LiDAR utilizes a motor to rotate at a constant speed, emits laser light while rotating at a constant speed, receives reflected light reflected from an object, and measures location information related to the object within the rotation angle. The obtained location information related to the object is formed of angle information (degree) and distance information (distance) from a reference location.

The scanning LiDAR needs to emit laser light at very short time intervals to accurately determine a location of an object, and to this end, the scanning LiDAR utilizes a timer interrupt of a Light Detection and Ranging (LiDAR) control device or a semiconductor.

However, when the interrupt task of the timer interrupt is excessive or laser light is not emitted at regular time intervals due to a decrease in an operation speed of the semiconductor, there is a problem in that the distortion is generated in the location information related to the object and the distortion is generated in a scanning measurement result.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method of correcting an error of a scanning LiDAR, which measures a measurement time interval of a scanning LiDAR which needs to emit laser light at regular time intervals during constant-speed rotation through a motor by use of a Time to Digital Converter (TDC), determines whether the measurement time interval has an error, and corrects an object measurement location when the error is generated, preventing occurrence of distortion in the measurement result.

Various aspects of the present invention are directed to providing a method of correcting an error of a scanning LiDAR of which at least a portion is rotated and driven by a motor, the method including: an error determining operation of determining a measurement time error between a time interval expected value which is a theoretical measurement time interval of the scanning LiDAR and a time interval measurement value which is an actual measurement time interval of the scanning LiDAR; and an error correcting operation of correcting a measurement location of the scanning LiDAR according to the measurement time error.

The method may further include: an initial value setting operation of designating an initial emission time point among a plurality of laser light emission time points of the scanning LiDAR used for determining the time interval measurement value; and a designated value increasing operation of designating at least one laser light emission time point after the initial emission time point among the plurality of laser light emission time points.

The error determining operation may include determining a first difference value which is equal to a difference between the designated laser light emission time point and a laser light emission time point according to the time interval expected value, determining a second difference value which is equal to a difference between the first difference value and a laser light emission time point according to the time interval expected value one more time, and then determining an absolute value of the second difference value.

The error determining operation may include determining that an error is generated in the time interval measurement value when the absolute value exceeds an predetermined allowable error amount.

The error determining operation may include determining whether the time interval measurement value has an error according to an error algorithm based on an Equation below, $$|(t_i - t_e) - t_e| > t_c \qquad [\text{Equation}]$$

wherein $t_i$ is the laser light emission time point according to the time interval measurement value, $t_e$ is the laser light emission time point according to the time interval expected value, and $t_c$ is the predetermined allowable error amount.

The error correcting operation may include determining an error ratio by use of the designated laser light emission time point and the laser light emission time point according to the time interval expected value, and correcting a measurement location of the scanning LiDAR by applying the error ratio to a pre-prepared correction algorithm.

The error correcting operation may include determining a difference between the designated laser light emission time point and the laser light emission time point according to the time interval expected value, and dividing the difference by the laser light emission time point according to the time interval expected value to determine the error ratio.

The error correcting operation may include determining the error ratio according to an Equation below, $$\Gamma = (t_i - t_e)/t_e \qquad [\text{Equation}]$$

wherein r is the error ratio, $t_i$ is the designated laser light emission time point, and $t_e$ is the laser light emission time point according to the time interval expected value.

The error correcting operation may include determining a laser light emission angle corresponding to the designated laser light emission time point by use of the laser light emission angle according to the time interval expected value and the error ratio.

The error correcting operation may include determining a difference between the laser light emission angle according to the time interval expected value and a laser light emission angle at the initial emission time point, multiplying the difference and the error ratio, and adding the laser light emission angle at the initial emission time point to a result of the multiplying to determine the laser light emission angle corresponding to the designated laser light emission time point.

The error correcting operation may include determining the laser light emission angle corresponding to the designated laser light emission time point according to the correction algorithm based on an Equation below, $$d(i)=(de-d0) \times r + d0, \quad \text{[Equation]}$$

wherein in the Equation, $d_{(i)}$ is the laser light emission angle in which the error is corrected at the laser light emission time point according to variable i, $d_e$ is a laser light emission angle according to the time interval expected value, $d_0$ is a laser light emission angle at the initial emission time point $t_0$, and r is the error ratio.

The designated value increasing operation may include newly designating at least one laser light emission time point after the designated laser light emission time point after the error determining operation or the error correcting operation.

The designated value increasing operation, the error determining operation, and the error correcting operation may be repeatedly performed until an error for the last laser light emission time point among the plurality of laser light emission time points is determined and corrected.

According to the method of correcting the error of the scanning LiDAR according to the exemplary embodiments of the present invention, it is possible to correct an object measurement location when an error is generated in a measurement time interval, preventing a distortion of a measurement result of the scanning LiDAR generated due to the error in the measurement time interval.

The method of correcting the error of the scanning LiDAR according to the exemplary embodiments of the present invention may be widely applied to 2D scanning, 3D scanning, a radar, and the like.

When the method of correcting the error of the scanning LiDAR according to the exemplary embodiments of the present invention is applied to an autonomous vehicle, it is possible to prevent an accident caused by a distortion of a measurement result (road situation) of the scanning LiDAR.

The foregoing BRIEF SUMMARY is illustrative only and is not intended to be in any way limiting. In addition to the illustrative aspects, embodiments, and features described above, further aspects, embodiments, and features will become apparent by reference to the drawings and the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
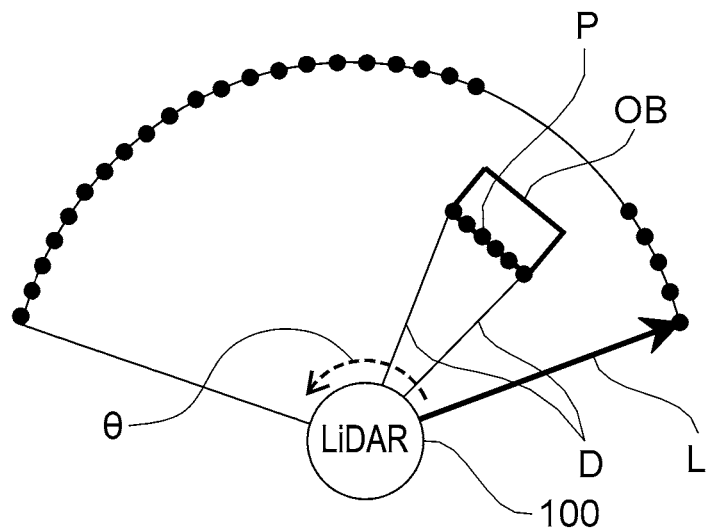
FIG. 1A, FIG. 1B and FIG. 1C are diagrams illustrating a situation where distortion occurs in a measurement result of a scanning LiDAR.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 1B:
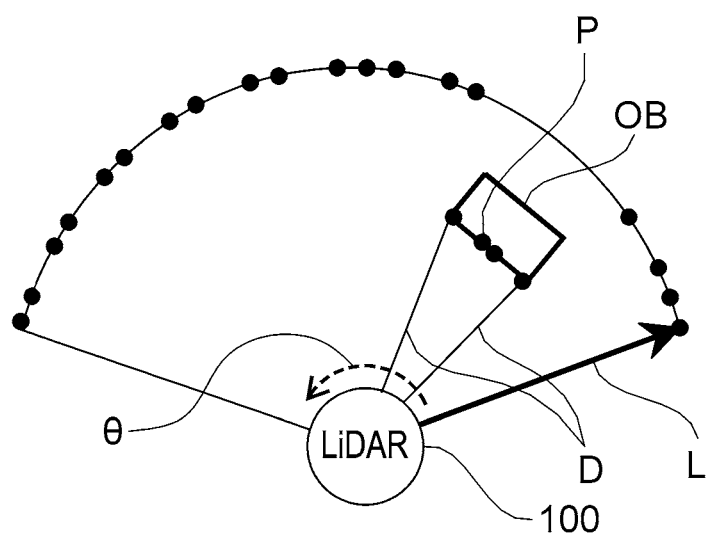
Figure 1C:
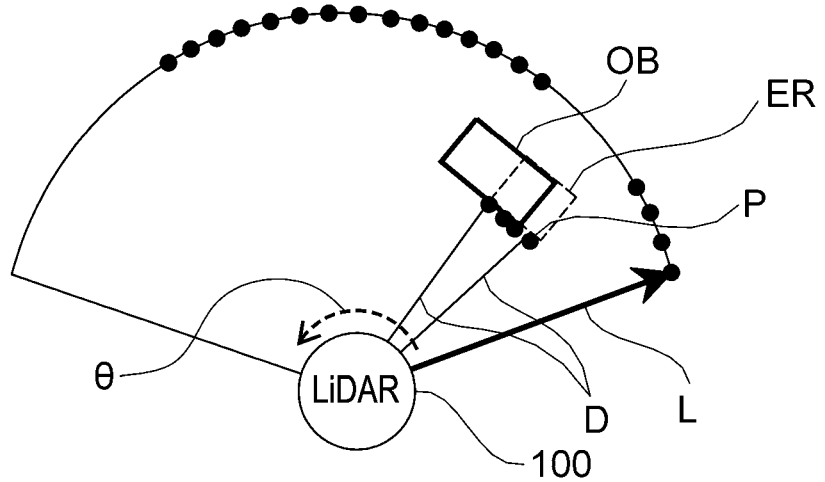

FIG. 1A, FIG. 1B and FIG. 1C are diagrams illustrating a situation where distortion occurs in a measurement result of a scanning LiDAR. FIG. 1A is a diagram illustrating an object measuring situation of a general scanning LiDAR. FIG. 1B is a diagram illustrating an object measuring situation according to an error in a measurement time interval of a scanning LiDAR. FIG. 1C is a diagram illustrating a measurement result distorted according to the error in the measurement time interval of the scanning LiDAR.

FIG. 1A, the scanning LiDAR 100 rotates at a constant speed through motor driving. The scanning LiDAR 100 emits laser light L at regular time intervals while rotating at a constant speed, receives reflective light hitting a surface point P of an object OB and reflected and turning back, and obtains accurate location information related to the object OB. The location information related to the object OB includes angle information θ and distance information D from a reference location.

In the meantime, FIG. 1B, the scanning LiDAR 100 emits the laser light L at a measurement time interval in which an error is generated due to excessive interrupt task of a timer interrupt, a decrease in an operation speed of a semiconductor, or the like. The scanning LiDAR 100 emits laser light L at the measurement time interval in which the error is generated while rotating at a constant speed, receives reflective light hitting the surface point P of the object OB and reflected and turning back, and obtains location information related to the object OB. In the instant case, the distortion occurs in the obtained location information related to the object OB.

In FIG. 1C, the scanning LiDAR 100 obtains distorted location information related to an object ER and not actual location information related to the object (OB). The distorted location information related to the object ER may cause a serious problem in a field to which the scanning LiDAR 100 is applied, so that a proper correction is required.

Hereinafter, a configuration of the scanning LiDAR which is configured for detecting the generation of an error in a measurement time interval and correcting the error, preventing the obtaining of distorted location information related to an object will be described.

Figure 2:
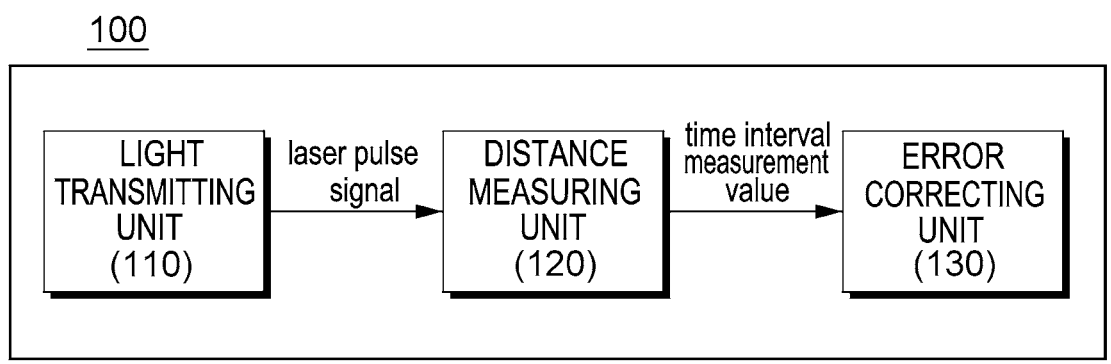
FIG. 2 is a block diagram illustrating a scanning LiDAR according to various exemplary embodiments of the present invention.

FIG. 2 is a block diagram illustrating the scanning LiDAR according to the exemplary embodiment of the present invention.

Referring to FIG. 2, the scanning LiDAR 100 the exemplary embodiment of the present invention may include a light transmitting unit 110, a distance measuring unit 120, and an error correcting unit 130. In addition to the foregoing configurations, the scanning LiDAR 100 may further include a light receiving unit receiving reflective light, a pre-processing unit pre-processing the reflective light received by the light receiving unit, a motor rotating and driving the scanning LiDAR 100, and the like. Hereinafter, a detailed description of the general configuration of the scanning LiDAR 100 will be omitted.

The light transmitting unit 110 generates a laser pulse signal. The light transmitting unit 110 may control a laser diode to emit laser light corresponding to the laser pulse signal. In the instant case, the light transmitting unit 110 may transmit the laser pulse signal to the distance measuring unit 120. Through this, the light transmitting unit 110 may provide the distance measuring unit 120 with a laser light emission time point according to the laser pulse signal.

The distance measuring unit 120 may measure location information related to an object by use of a time interval between the laser light emission time point and the laser light reception time point. In the exemplary embodiment of the present invention, the distance measuring unit 120 may be configured to measure a distance from the object by use of a Time to Digital Converter (TDC).

The distance measuring unit 120 may receive the plurality of laser pulse signals from the light transmitting unit 110. The distance measuring unit 120 may determine a plurality of laser light emission time points through the plurality of laser pulse signals received from the light transmitting unit 110. The distance measuring unit 120 may determine a measurement time interval by use of the plurality of laser light emission time points. Hereinafter, the measurement time interval determined by the distance measuring unit 120 is defined as a time interval measurement value.

The error correcting unit 130 may determine suitability of the time interval measurement value determined by the distance measuring unit 120. The error correcting unit 130 may have a time interval expected value for the measurement time interval based on an operation (rotation) speed of the motor rotating the scanning LiDAR 100 and resolution. The error correcting unit 130 may determine whether the time interval measurement value determined by the distance measuring unit 120 has an error by use of the time interval expected value. The error correcting unit 130 may correct the error of the time interval measurement value through a pre-prepared correcting algorithm when the error is generated in the time interval measurement value. The error correcting unit 130 may transmit the time interval measurement value of which the error is corrected to the distance measuring unit 120. The distance measuring unit 120 may measure the location information related to the object based on the time interval measurement value of which the error is corrected.

Figure 3:
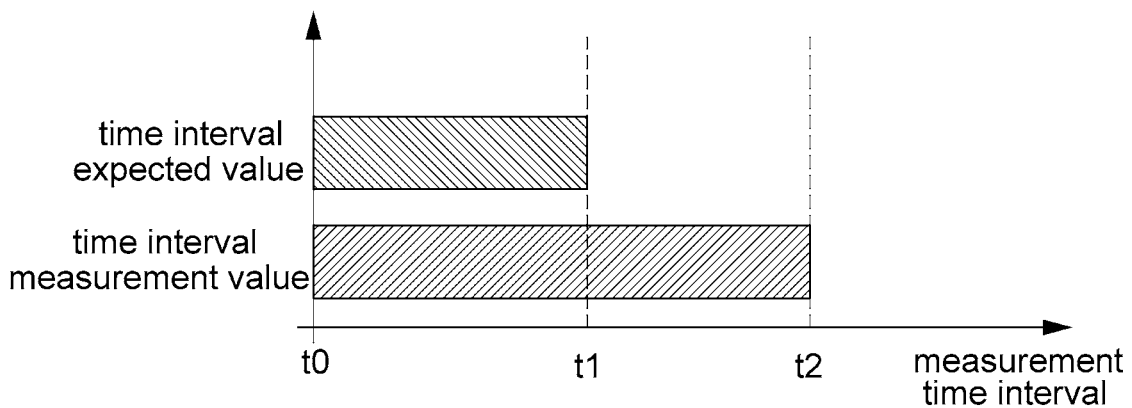
FIG. 3 is a diagram illustrating a comparison between a time interval expected value and a time interval measurement value.

FIG. 3 is a diagram illustrating a comparison between the time interval expected value and the time interval measurement value.

Referring to FIG. 3, the error correcting unit 130 may estimate a time interval expected value for once measurement time interval according to the operation speed of the motor and the resolution as described above, and the time interval expected value of the error correcting unit 130 is a time from $t_0$ to $t_1$. In the exemplary embodiment of the present invention, it is assumed that the time interval measurement value which the distance measuring unit 120 determines by receiving the plurality of laser pulse signals from the light transmitting unit 110 is a time from $t_0$ to $t_2$. In the instant case, an error ratio r is $t_2/t_1$.

When an error is generated in the time interval measurement value determined by the distance measuring unit 120, the measurement result of the scanning LiDAR 100 for the location information related to the object may be output on a screen at a constant interval or an error may be generated in a separate computation program using the measurement result.

Hereinafter, a method of correcting an error of a time interval measurement value for preventing the foregoing problem will be described.

Figure 4:
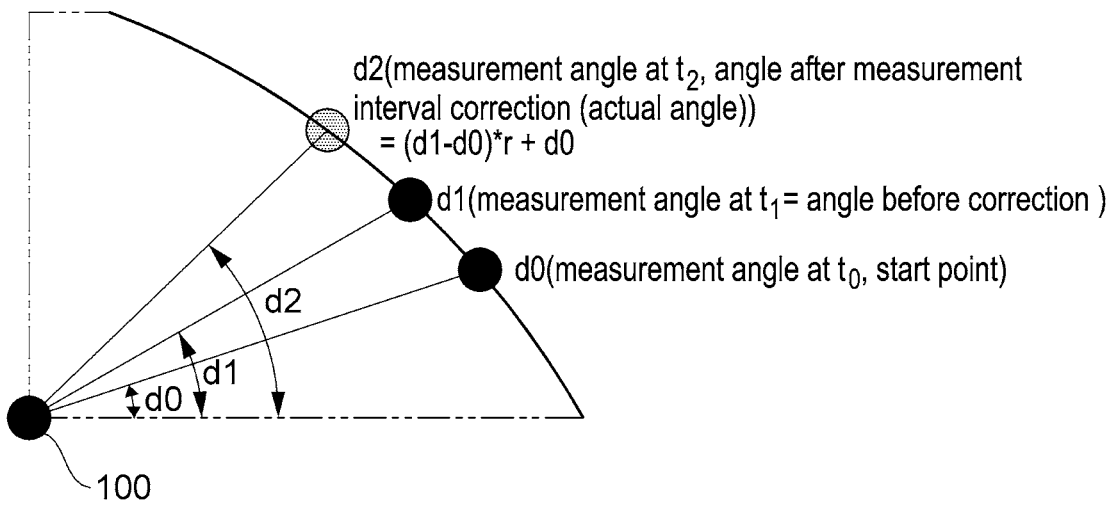
FIG. 4 is a diagram for illustrating a correction of an error for a measurement time interval of the scanning LiDAR.

FIG. 4 is a diagram for illustrating a correction of an error for the measurement time interval value determined by the distance measuring unit 120. Referring to FIG. 3 and FIG. 4, it may be seen a measurement angle $d_0$ at a time point $t_0$, a measurement angle $d_1$ at a time point $t_1$ (measurement angle before the correction), and a measurement angle $d_2$ at a time point $t_2$ (actual angle or measurement angle after the correction).

Herein, the measurement angle $d_2$ at the time point $t_2$ of the time interval measurement value may be determined according to Equation 1 below.

$$d2=(d1-d0)\times r + d0 \quad \text{[Equation 1]}$$

In Equation 1, $d_2$ is a measurement angle after the correction, $d_1$ is a measurement angle before the correction, $d_0$ is a measurement angle at the measurement time $t_0$, and r is an error ratio between the time interval measurement value $t_2$ and the time interval expected value $t_1$.

The error correcting unit 130 may determine the measurement angle $d_2$ in the time interval measurement value $t_2$ according to Equation 1. That is, the error correcting unit 130 may determine the measurement angle $d_2$ in the time interval measurement value $t_2$ by obtaining a difference value between the measurement angle $d_1$ in the time interval expected value $t_1$ and the measurement angle $d_0$ at the measurement time $t_0$, multiplying the obtained difference value and the error ratio r, and adding the measurement angle $d_0$ to the multiplying result.

The distance measuring unit 120 may measure accurate location information related to the object by use of the determined measurement angle $d_2$ and the time interval measurement value $t_2$.

Figure 5:
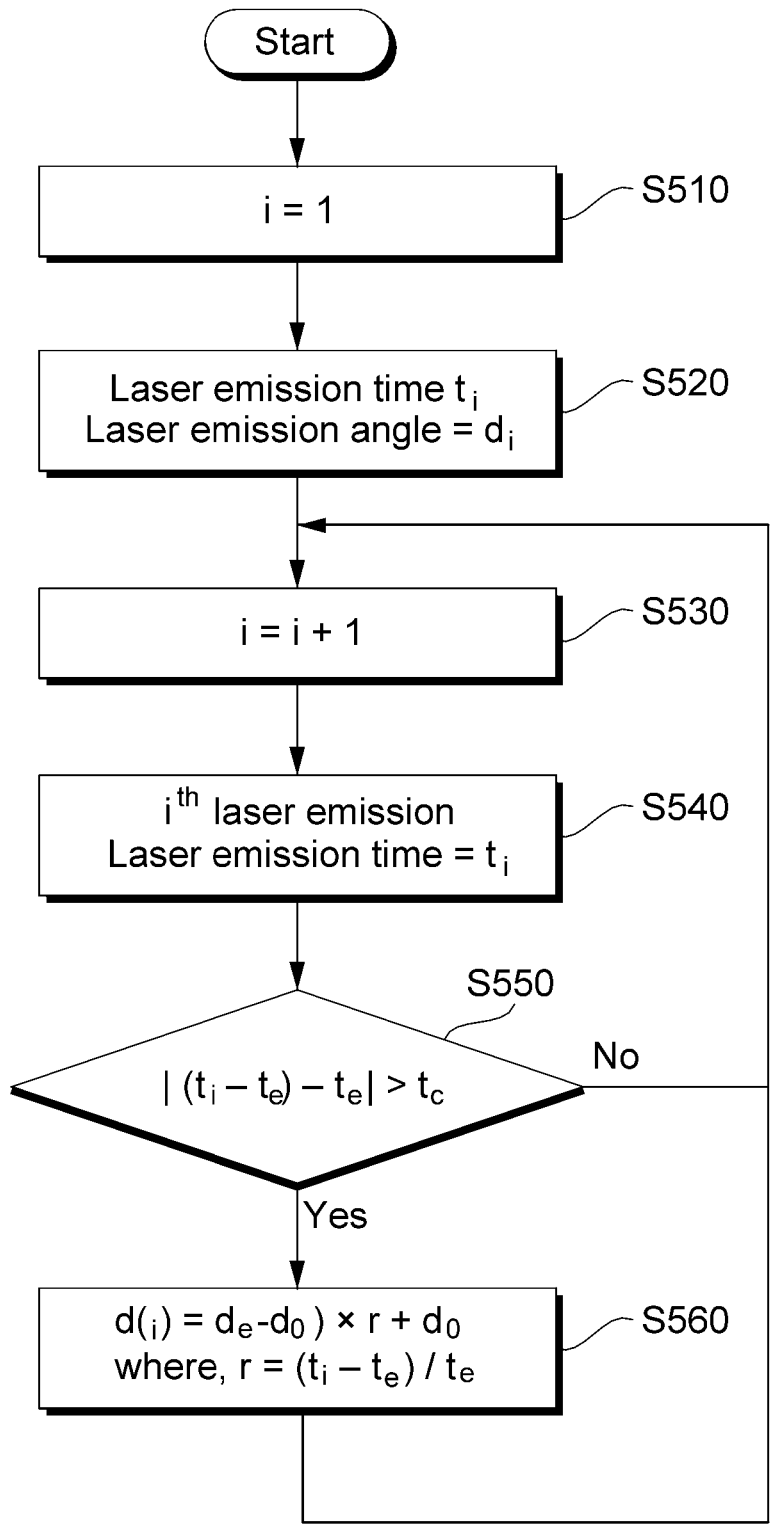
FIG. 5 is a flowchart illustrating a method of correcting an error of a scanning LiDAR according to various exemplary embodiments of the present invention.

FIG. 5 is a flowchart illustrating a method of correcting an error of a scanning LiDAR according to various exemplary embodiments of the present invention.

Referring to FIG. 5, a method of correcting an error of a scanning LiDAR according to various exemplary embodiments of the present invention includes a variable setting operation S510, an initial value setting operation S520, a variable increasing operation S530, a designated value increasing operation S540, an error determining operation S550, and an error correcting operation S560.

First, in the variable setting operation S510, when the error correcting unit 130 receives a determined time interval measurement value from the distance measuring unit 120, the error correcting unit 130 may set a variable i for designating any one among a plurality of laser light emission time points used for determining a time interval measurement value. The error correcting unit 130 may set 1 to the variable i for designating an initial laser light emission time point.

Next, in the initial value setting operation S520, the error correcting unit 130 may designate an initial emission time point among the plurality of laser light emission time points. In the exemplary embodiment of the present invention, the error correcting unit 130 may set an initial emission time point $t_1$ corresponding to the variable value "1" set to the variable i among the plurality of laser light emission time points $t_i$. Next, the error correcting unit 130 may designate an initial emission angle $d_1$ corresponding to the initial emission time point $t_1$ among the laser light emission angles.

Next, in the variable increasing operation S530, the error correcting unit 130 may increase the variable i by adding 1 to the variable i to determine an error of the measurement time interval according to the initial emission time point and a next laser light emission time point. In the exemplary embodiment of the present invention, a variable value set to the variable i may be "2". Herein, the variable i may continuously increase by the number of the plurality of laser light emission time points through the repetitive performance of operation S530.

Next, in the designated value increasing operation S540, the error correcting unit 130 may newly designate a laser light emission time point $t_i$ according to the variable i in which the variable value is increased by "1" in the variable increasing operation S530. In the exemplary embodiment of the present invention, the error correcting unit 130 may set the laser light emission time point $t_1$ at which the laser light is emitted at the $i^{th}$ time. The error correcting unit 130 may designate a second laser light emission time point $t_2$ according to the laser light emission time point $t_i$ in which the variable value "2" is set. Accordingly, the error correcting unit 130 may determine an error in the measurement time interval according to the initial emission time point $t_1$ and the second laser light emission time point $t_2$ and correct the error.

Next, in the error determining operation S550, the error correcting unit 130 determines a measurement time error between a time interval expected value which is a theoretical measurement time interval of the scanning LiDAR 100 and the time interval measurement value which is the actual measurement time interval of the scanning LiDAR 100. Before the determination, the error correcting unit 130 determines whether the time interval measurement value (measurement time interval) received from the distance measuring unit 120 has an error by applying the laser light emission time point $t_i$ designated in operation S540 to a pre-prepared error algorithm.

Herein, the error algorithm may be formed according to Equation 2 below.

$$|(ti-te)-te| > tc \qquad \text{[Equation 2]}$$

In Equation 2, $t_1$ is a laser light emission time point according to the time interval measurement value, $t_e$ is a laser light emission time point according to the time interval expected value, and $t_c$ is an predetermined allowable error amount. Herein, the predetermined allowable error amount $t_c$ may be appropriately set according to a need of a user.

The error correcting unit 130 may determine a difference between the time interval measurement value $t_i$ and the time interval expected value $t_e$, determines a difference between the difference and the time interval expected value $t_c$ one more time, and then determine an absolute value (measurement time error) of the obtained result. When the determined absolute value exceeds the predetermined allowable error amount $t_c$, the error correcting unit 130 may determine that the error is generated in the time interval measurement value.

Next, in the error correcting operation S560, the error correcting unit 130 corrects a measurement location (laser light emission angle) of the scanning LiDAR 100 according to the measurement time error. When it is determined that the error is generated in the time interval measurement value, the error correcting unit 130 may determine an error ratio according to the generation of the error, and newly determine a laser light emission angle corresponding to the designated laser light emission time point by use of the determined error ratio.

The laser light emission angle may be determined through a correction algorithm according to Equation 3 below. Herein, Equation 3 may be prepared based on Equation 1.

$$d(i) = (de - d0) \times \Gamma + d0,$$

$$\text{where, } \Gamma = (ti - te)/te \qquad \text{[Equation 3]}$$

In Equation 3, $d_{(i)}$ is the laser light emission angle in which the error is corrected at the laser light emission time point according to variable i, $d_e$ is a laser light emission angle according to the time interval expected value, $d_0$ is a laser light emission angle at the laser light emission time point (initial emission time point) $t_0$, r is an error ratio, $t_i$ is a laser light emission time point according to the time interval measurement value, and $t_e$ is a laser light emission time point according to the time interval expected value.

The error correcting unit 130 determines a difference between the laser light emission time point $t_i$ according to the time interval measurement value and the laser light emission time point $t_e$ according to the time interval expected value, and divides the difference result by the laser light emission time point $t_e$ according to the time interval expected value to determine the error ratio.

The error correcting unit 130 determines a difference between the laser light emission time angle $d_e$ according to the time interval expected value and the laser light emission time angle $d_0$ at the laser light emission time point (initial emission time point) $t_0$, multiplies the difference and the error ratio r, and adds the laser light emission angle $d_0$ at the laser light emission time point $t_0$ to a result of the multiplying to determine a laser light emission angle $d_{(i)}$ at a laser light emission time point $t_i$.

Accordingly, errors of another laser light emission time point among the plurality of laser light emission time points and a laser light emission angle corresponding to another laser light emission time point may be determined or corrected according to the repetitive performance of operations S530 to S560. The repetitive performance of operations S530 to S560 may be performed until the error for the last laser light emission time point among the plurality of laser light emission time points is determined and corrected.

The error correcting unit 130 may transmit the determined laser light emission angle to the distance measuring unit 120. The distance measuring unit 120 may accurately obtain location information related to an object by use of the time interval measurement value and the laser light emission angle newly determined in the error correcting unit 130.

The steps and/or operations according to various exemplary embodiments of the present invention may occur in different order, or in parallel, or simultaneously in different exemplary embodiments for different epochs and the like as may be appreciated by those skilled in the art.

Depending on the exemplary embodiment of the present invention, a portion or the entirety of the steps and/or operations may be implemented or performed by use of commands stored in one or more non-temporary computer-readable medium, a program, an interactive data structure, and one or more processors driving a client and/or a server. One or more non-temporary computer-readable media are, for example, software, firmware, hardware, and/or any combination thereof. Furthermore, the function of "module" discussed in the exemplary embodiment may be implemented by software, firmware, hardware, and/or any combination thereof.

Meanwhile, the exemplary embodiments according to various exemplary embodiments of the present invention may be implemented in a form of program instructions which may be executed by computers, and may be recorded in computer readable media. The computer readable media may include program instructions, data file, data structure, or a combination thereof. By way of example, and not limitation, computer readable media may include computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which can accessed by computer. Communication media typically embodies computer readable instructions, data structures, program modules or other data in a modulated data signal such as a planet carrier wave or other transport mechanism and includes any information delivery media. The term "modulated data signal" means a signal that has one or more of its characteristics set or changed to encode information in the signal. By way of example, and not limitation, communication media includes wired media such as a wired network or direct-wired connection, and wireless media such as acoustic, RF, infrared and other wireless media. Combinations of any of the above may also be included within the scope of computer readable media.

In various exemplary embodiments of the present invention, the computer may include a controller.

In various exemplary embodiments of the present invention, each operation described above may be performed by the controller, and the controller may be configured by a plurality of controllers, or an integrated single controller.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of correcting an error of a scanning Light Detection and Ranging (LiDAR) of which at least a portion is rotated and driven by a motor, the method comprising:
   an error determining operation of determining, by a controller, a measurement time error between a time interval expected value which is a theoretical measurement time interval of the scanning LiDAR and a time interval measurement value which is an actual measurement time interval of the scanning LiDAR; and
   an error correcting operation of correcting, by the controller, a measurement location of the scanning LiDAR according to the measurement time error,
   wherein the error determining operation includes determining a first difference value which is equal to a difference between at least one laser light emission time point designated and a laser light emission time point according to the time interval expected value, determining a second difference value which is equal to a difference between the first difference value and the laser light emission time point according to the time interval expected value one more time, and then determining an absolute value of the second difference value.

2. The method of claim 1, further including:
   an initial value setting operation of designating an initial emission time point among a plurality of laser light emission time points of the scanning LiDAR used for determining the time interval measurement value; and
   a designated value increasing operation of designating the at least one laser light emission time point after the initial emission time point among the plurality of laser light emission time points.

3. The method of claim 2, wherein the error determining operation includes determining that an error is generated in the time interval measurement value upon determining that the absolute value exceeds an predetermined allowable error amount.

4. The method of claim 2, wherein the error determining operation includes determining whether the time interval measurement value has an error according to an error algorithm according to an Equation below, $$|(t_i - t_e) - t_e| > t_c \qquad \text{[Equation]}$$

wherein $t_i$ is a laser light emission time point among the plurality of laser light emission time points according to the time interval measurement value, $t_e$ is a laser light emission time point among the plurality of laser light emission time points according to the time interval expected value, and $t_c$ is a predetermined allowable error amount.

5. The method of claim 2, wherein the error correcting operation includes determining an error ratio by use of the designated at least one laser light emission time point and the laser light emission time point among the plurality of laser light emission time points according to the time interval expected value, and correcting a measurement location of the scanning LiDAR by applying the error ratio to a pre-prepared correction algorithm.

6. The method of claim 5, wherein the error correcting operation further includes determining a difference between the designated at least one laser light emission time point and the laser light emission time point among the plurality of laser light emission time points according to the time interval expected value, and dividing the difference by the designated at least one laser light emission time point according to the time interval expected value to determine the error ratio.

7. The method of claim 5, wherein the error correcting operation further includes determining the error ratio according to an Equation below, $$r=(t_i-t_e)/t_e \quad \text{[Equation]}$$

wherein r is the error ratio, $t_i$ is the designated at least one laser light emission time point, and $t_e$ is the laser light emission time point among the plurality of laser light emission time points according to the time interval expected value.

8. The method of claim 5, wherein the error correcting operation further includes determining a laser light emission angle corresponding to the designated at least one laser light emission time point by use of the laser light emission angle according to the time interval expected value and the error ratio.

9. The method of claim 8, wherein the error correcting operation further includes determining a difference between the laser light emission angle according to the time interval expected value and a laser light emission angle at the initial emission time point, multiplying the difference and the error ratio, and adding the laser light emission angle at the initial emission time point to a result of the multiplying to determine the laser light emission angle corresponding to the designated at least one laser light emission time point.

10. The method of claim 8, wherein the error correcting operation further includes determining the laser light emission angle corresponding to the designated at least one laser light emission time point according to the pre-prepared correction algorithm according to an Equation below, $$d(i)=(d_e-d_0)\times r+d_0, \quad \text{[Equation]}$$

wherein $d_{(i)}$ is the laser light emission angle in which an error is corrected at the laser light emission time point according to variable i, $d_e$ is the laser light emission angle according to the time interval expected value, $d_0$ is a laser light emission angle at the initial emission time point $t_0$, and r is the error ratio.

11. The method of claim 2, wherein the designated value increasing operation includes newly designating at least one laser light emission time point after the designated at least one laser light emission time point after the error determining operation or the error correcting operation.

12. The method of claim 11, wherein the designated value increasing operation, the error determining operation, and the error correcting operation are repeatedly performed until an error for a last laser light emission time point among the plurality of laser light emission time points is determined and corrected.

13. The method of claim 1, wherein the controller includes:
a processor; and
a non-transitory storage medium on which a program for performing the method of claim 1 is recorded and executed by the processor.

14. A scanning Light Detection and Ranging (LiDAR) apparatus of which at least a portion is rotated and driven by a motor, wherein the LiDAR apparatus includes a controller configured of performing:

an error determining operation of determining a measurement time error between a time interval expected value which is a theoretical measurement time interval of the scanning LiDAR and a time interval measurement value which is an actual measurement time interval of the scanning LiDAR; and
an error correcting operation of correcting a measurement location of the scanning LiDAR according to the measurement time error,
wherein the error determining operation includes determining a first difference value which is equal to a difference between at least one laser light emission time point designated and a laser light emission time point according to the time interval expected value, determining a second difference value which is equal to a difference between the first difference value and the laser light emission time point according to the time interval expected value one more time, and then determining an absolute value of the second difference value.

15. The scanning (LiDAR) apparatus of claim 14, wherein the controller is further configured of performing:
an initial value setting operation of designating an initial emission time point among a plurality of laser light emission time points of the scanning LiDAR used for determining the time interval measurement value; and
a designated value increasing operation of designating the at least one laser light emission time point after the initial emission time point among the plurality of laser light emission time points.

16. The scanning (LiDAR) apparatus of claim 15,
wherein the error correcting operation includes determining an error ratio by use of the designated at least one laser light emission time point and a laser light emission time point among the plurality of laser light emission time points according to the time interval expected value, and correcting a measurement location of the scanning LiDAR by applying the error ratio, and
wherein the error ratio is set by determining a difference between the designated at least one laser light emission time point and the laser light emission time point among the plurality of laser light emission time points according to the time interval expected value, and dividing the difference by the laser light emission time point among the plurality of laser light emission time points according to the time interval expected value.

17. The scanning (LiDAR) apparatus of claim 15,
wherein the error correcting operation includes determining a laser light emission angle corresponding to the designated at least one laser light emission time point by use of a laser light emission angle according to the time interval expected value and an error ratio, the error ratio being determined by use of the designated at least one laser light emission time point and the laser light emission time point among the plurality of laser light emission time points according to the time interval expected value, and
wherein the error correcting operation further includes determining a difference between the laser light emission angle according to the time interval expected value and a laser light emission angle at the initial emission time point, multiplying the difference and the error ratio, and adding the laser light emission angle at the initial emission time point to a result of the multiplying to determine the laser light emission angle corresponding to the designated at least one laser light emission time point.

\* \* \* \* \*